US012364891B2

(12) United States Patent
Shields et al.

(10) Patent No.: US 12,364,891 B2
(45) Date of Patent: *Jul. 22, 2025

(54) ADAPTER FOR CONCEALED SPRINKLER

(71) Applicant: IPEX USA LLC, Pineville, NC (US)

(72) Inventors: Steven L. Shields, Lubbock, TX (US); William K. Rucker, Cranston, RI (US); Lyle J. Miller, Milford, CT (US)

(73) Assignee: IPEX USA LLC, Pineville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,490

(22) Filed: May 23, 2024

(65) Prior Publication Data
US 2024/0307723 A1 Sep. 19, 2024

Related U.S. Application Data

(63) Continuation of application No. 17/339,189, filed on Jun. 4, 2021, now Pat. No. 12,017,103.

(60) Provisional application No. 63/035,047, filed on Jun. 5, 2020.

(51) Int. Cl.
A62C 35/68 (2006.01)
F16L 41/02 (2006.01)

(52) U.S. Cl.
CPC ............ A62C 35/68 (2013.01); F16L 41/021 (2013.01)

(58) Field of Classification Search
CPC ......... F16L 41/03; F16L 41/021; F16L 41/08; F16L 41/082; A62C 35/68; A62C 35/58
See application file for complete search history.

(56) References Cited

U.S. PATENT DOCUMENTS

| 1,172,958 | A | 2/1916 | Donohue |
| 1,701,692 | A | 2/1929 | Mueller |
| 1,979,400 | A | 11/1934 | Neilon |
| 2,423,633 | A | 7/1947 | Baden |
| 2,548,788 | A | 4/1951 | Helme |
| 3,307,205 | A | 3/1967 | Moeschler |
| 3,373,452 | A | 3/1968 | Watts |
| 3,604,510 | A | 9/1971 | Tainsh |
| 3,833,062 | A | 9/1974 | Livingston |
| 3,971,573 | A | 7/1976 | Clements |
| 5,327,976 | A | 7/1994 | Hattori |
| 5,396,959 | A | 3/1995 | Macdonald |
| 6,523,616 | B1 | 2/2003 | Wallace |
| 6,540,261 | B1 | 4/2003 | Painter et al. |
| 7,886,837 | B1 | 2/2011 | Helfgott |
| 8,297,663 | B2 * | 10/2012 | Spears .................... F16L 15/02 285/355 |
| 8,800,673 | B2 | 8/2014 | Multer et al. |

(Continued)

Primary Examiner — David Bochna
(74) Attorney, Agent, or Firm — Foley Hoag LLP; Philip S. Choi

(57) ABSTRACT

A sprinkler adapter includes a first pipe receiver, a second pipe receiver, a channel, a first sprinkler port, and a second sprinkler port. The first pipe receiver couples with a first pipe. The second pipe receiver couples with a second pipe. The channel extends between the first pipe receiver and the second pipe receiver along a pipe axis. The first sprinkler port is fluidly coupled with the channel, couples with a first sprinkler, and defines a first port axis spaced from the pipe axis. The second sprinkler port is fluidly coupled with the channel, couples with a second sprinkler, and defines a second port axis spaced from the first port axis and the pipe axis.

18 Claims, 8 Drawing Sheets

(56) References Cited

U.S. PATENT DOCUMENTS

| | | |
|---|---|---|
| 10,940,350 B2 | 3/2021 | Pigeon |
| 12,017,103 B2 * | 6/2024 | Shields ................ F16L 41/021 |
| 2006/0001260 A1 | 1/2006 | Thompson |
| 2018/0243596 A1 | 8/2018 | Kim et al. |
| 2019/0374802 A1 | 12/2019 | Coletta et al. |
| 2020/0068820 A1 | 3/2020 | Kohavi et al. |
| 2022/0042288 A1 | 2/2022 | Braathen |

\* cited by examiner

ADAPTER FOR CONCEALED SPRINKLER

CROSS-REFERENCE TO RELATED APPLICATIONS

The present application is a continuation of U.S. patent application Ser. No. 17/339,189, filed Jun. 4, 2021, now U.S. Pat. No. 12,017,103, which claims the benefit of priority to U.S. Provisional Application No. 63/035,047, filed Jun. 5, 2020, the disclosure of which is incorporated herein by reference in its entirety.

BACKGROUND

Sprinklers can be used to address fire conditions. For example, a sprinkler can respond to a fire condition by outputting fluid from a fluid source. Concealed sprinklers can be installed in buildings, such as in walls of buildings, in a manner that reduces the physical extension and visibility of the sprinkler beyond the walls.

SUMMARY

At least one aspect relates to a sprinkler adapter. The sprinkler adapter includes a first pipe receiver, a second pipe receiver, a channel, a first sprinkler port, and a second sprinkler port. The first pipe receiver couples with a first pipe. The second pipe receiver couples with a second pipe. The channel extends between the first pipe receiver and the second pipe receiver along a pipe axis. The first sprinkler port is fluidly coupled with the channel, couples with a first sprinkler, and defines a first port axis spaced from the pipe axis. The second sprinkler port is fluidly coupled with the channel, couples with a second sprinkler, and defines a second port axis spaced from the first port axis and the pipe axis.

At least one aspect relates to a sprinkler assembly. The sprinkler assembly includes a first pipe connected with a fluid supply, a first pipe receiver that couples with the first pipe, a second pipe, a second pipe receiver that couples with the second pipe, a channel extending between the first pipe receiver and the second pipe receiver, a first sprinkler, a first sprinkler port fluidly coupled with the channel and the first sprinkler, a second sprinkler, and a second sprinkler port fluidly coupled with the channel and the second sprinkler.

At least one aspect relates to a method. The method can include connecting a first pipe with a first pipe receiver of a sprinkler adapter, connecting a second pipe with a second pipe receiver of the sprinkler adapter, connecting a first sprinkler with a first sprinkler port of the sprinkler adapter, connecting a second sprinkler with a second sprinkler port of the sprinkler adapter, mounting the first sprinkler with a first wall, and mounting the second sprinkler with a second wall spaced from the first wall.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Figure 1:
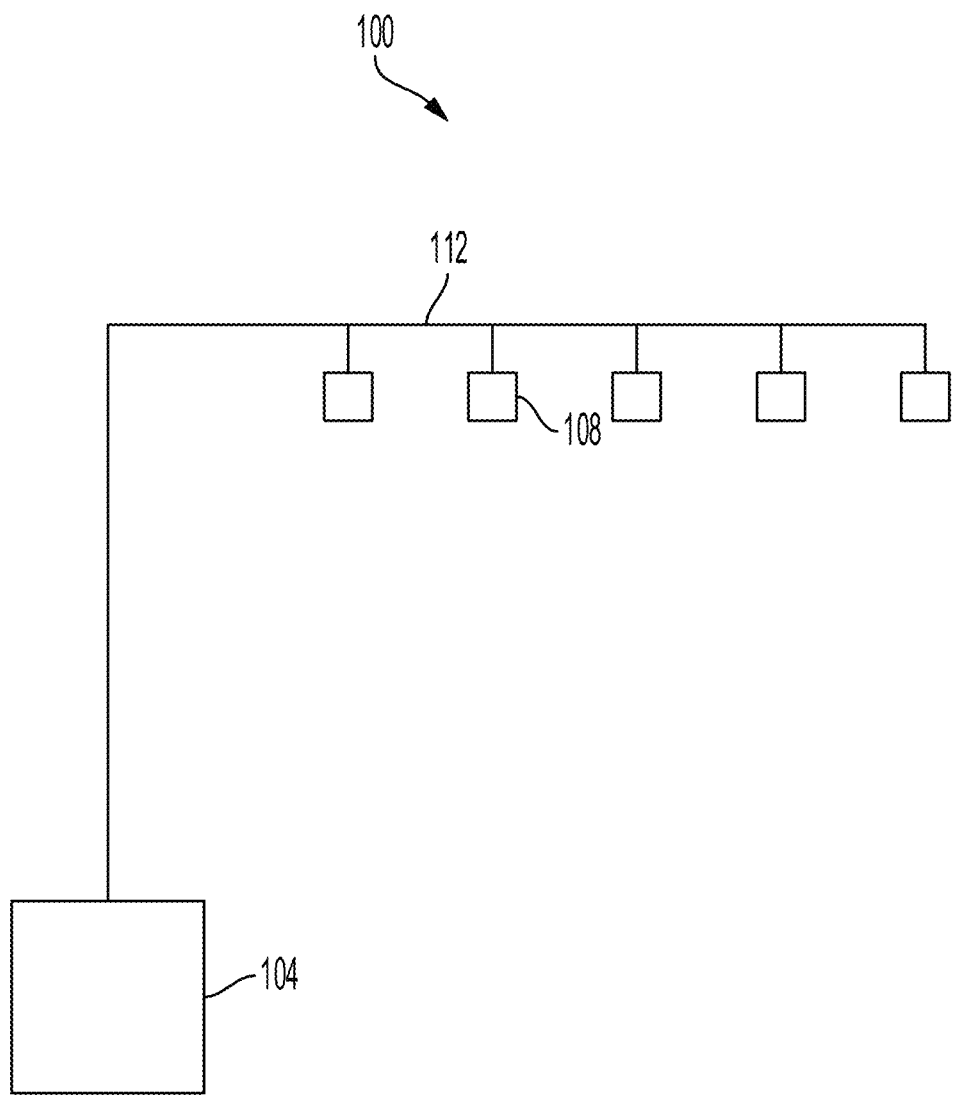
FIG. 1 depicts an example of a sprinkler system.

Following below are more detailed descriptions of various concepts related to, and implementations of sprinkler adapters. Sprinkler adapters can be used to connect sprinklers with pipes that provide fluid to the sprinklers. The various concepts introduced above and discussed in greater detail below can be implemented in any of numerous ways, including in sprinkler systems.

Concealed sprinklers can be installed in walls of buildings so that at least a portion of the sprinkler does not extend beyond the wall, and a cover can be placed over the sprinkler to conceal the sprinkler. Concealed sprinklers can be installed in space-limited regions, such as between two closely-spaced walls that may be constructed using two-by-four stud construction, such as a common wall in hotel rooms. The sprinklers can be connected with piping to receive fluid from the piping, and mounted within the walls (e.g., with brackets), using sprinkler adapters. However, space constraints in such installations can make it difficult to appropriately install and space the sprinklers while also connecting with piping. For example, installing two concealed sidewall sprinklers in a back-to-back configuration can require two separate fittings that are each positioned using a dedicated bracket and connected to separate pipes, increasing the complexity of the sprinkler system.

Systems and methods in accordance with the present disclosure can use a sprinkler adapter to enable two concealed sprinklers to be installed in a back-to-back cross configuration (e.g., using a single adapter fitting), reducing the complexity of the installation of the sprinkler system. The sprinkler adapter can enable the use of piping of a target size to be connected directly with the sprinkler adapter, eliminating the need to use components that reduce piping to a smaller size in order to provide clearance within the space-limited region in which the sprinkler system is installed.

For example, the sprinkler adapter can include a first pipe receiver, a second pipe receiver, a channel, a first sprinkler port, and a second sprinkler port. The first pipe receiver couples with a first pipe. The second pipe receiver couples with a second pipe. The channel extends between the first pipe receiver and the second pipe receiver along a pipe axis. The first sprinkler port is fluidly coupled with the channel, couples with a first sprinkler, and defines a first port axis spaced from the pipe axis. The second sprinkler port is fluidly coupled with the channel, couples with a second sprinkler, and defines a second port axis spaced from the first port axis and the pipe axis. The sprinkler adapter can be used to install sprinklers in a back to back configuration in relatively space-limited regions, such as between walls spaced by 3.5 inches by two by four studs and connected with one inch CPVC pipes, while avoiding the need to use adapters to connect with smaller piping to provide clearance (e.g., one inch pipe can be used without reducing to ¾ inch pipe). The sprinkler adapter can be shaped to form a back to back tee configuration with a single pipe receiver.

FIG. 1 depicts a sprinkler system 100. The sprinkler system 100 can include a fluid supply 104 coupled with one or more sprinklers 108 using one or more pipes 112. The sprinkler 108 can be actuated responsive to a fire condition, causing fluid to flow from the fluid supply 104 through the one or more pipes 112 and out of the sprinkler 108. The pipes 112 can extend through a building into a space between walls of the building. The pipes 112 can be arranged to couple with the sprinklers 108 using a sprinkler adapter as described herein (e.g., a back to back cross or tee fitting incorporating features of the sprinkler adapter 200). The pipes 112 can have an inner diameter less than 1.5 inches. The pipes 112 can have a nominal size of one inch, with an outer diameter of 1.315 inches and a wall thickness of 0.097 inches (plus or minus manufacturing tolerances).

Figure 2:
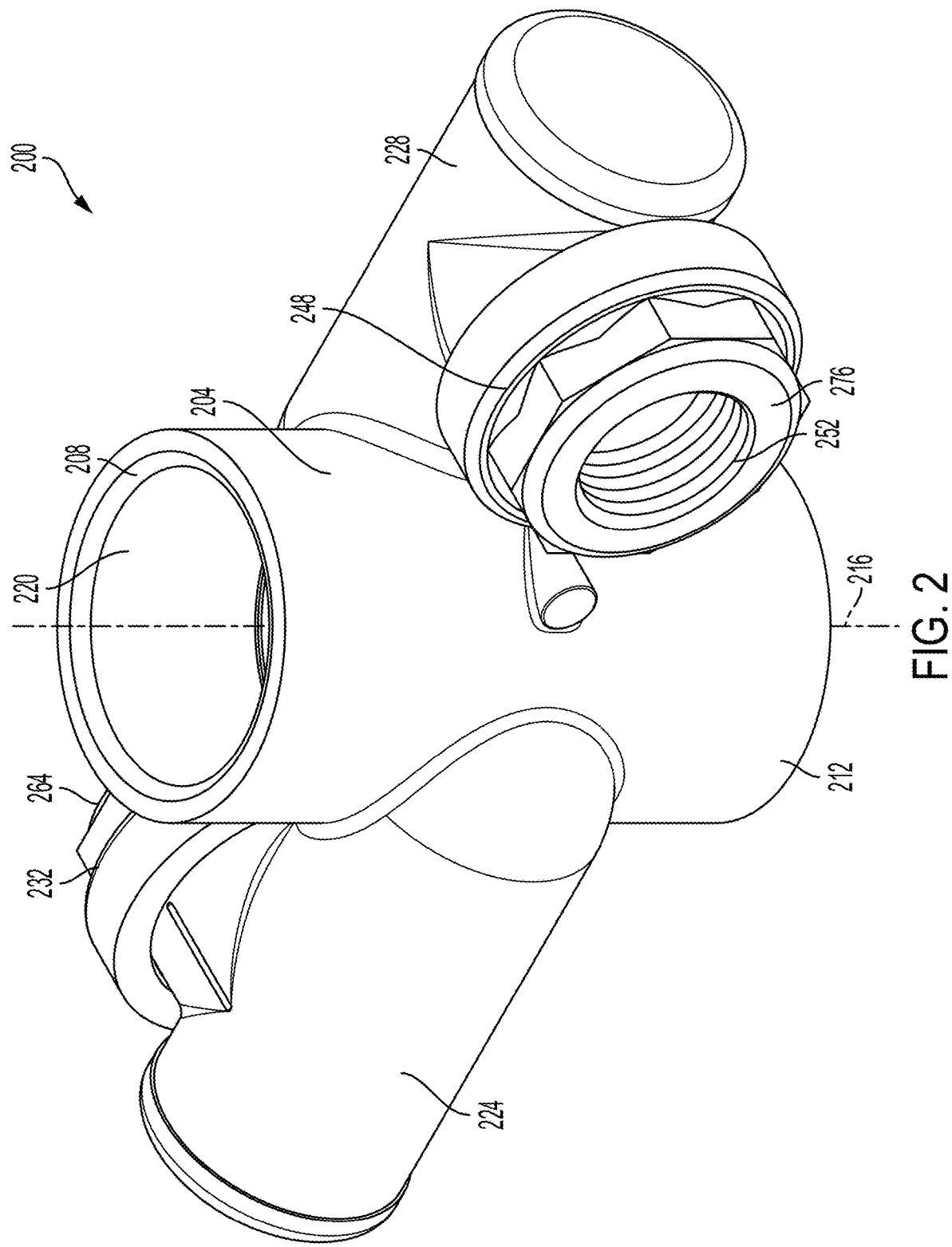
FIG. 2 depicts a perspective view of an example of a sprinkler adapter.
Figure 3:
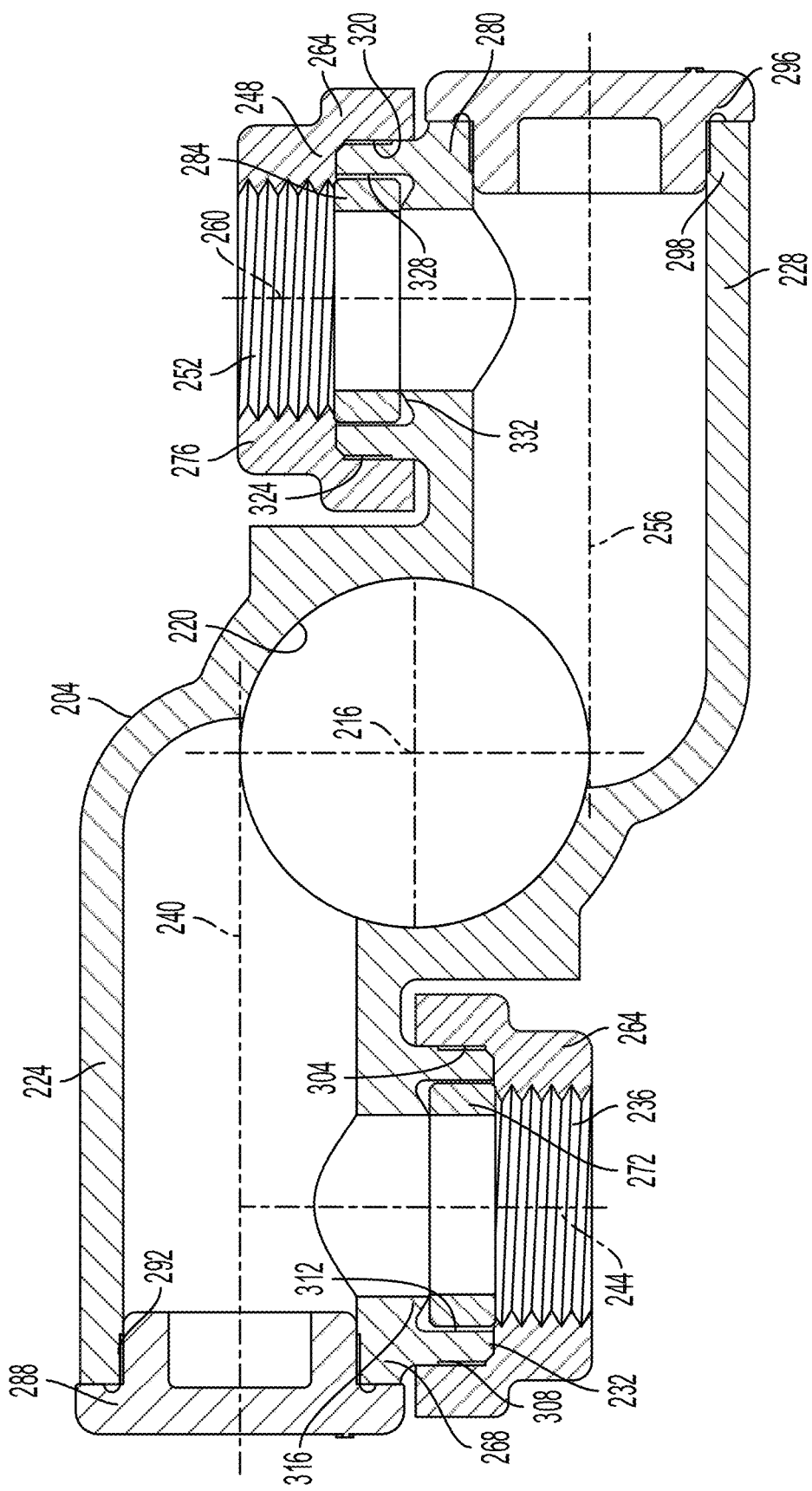
FIG. 3 depicts a partial view of an example of a sprinkler adapter.

FIGS. 2-3 depict a sprinkler adapter 200. The sprinkler adapter 200 can be used in the sprinkler system 100 to facilitate connecting the sprinklers 108 with the pipes 112. For example, the sprinkler adapter 200 can be used to connect two sprinklers 108 with one of the pipes 112 in order to connect the two sprinklers 108 with the fluid supply 104. The sprinkler adapter 200 can be used to connect the sprinklers 108 in a back-to-back configuration as described further with reference to FIGS. 4-5. The sprinkler adapter 200 and components thereof can be made from a polymeric material, such as chlorinated polyvinyl chloride (CPVC). The sprinkler adapter 200 can be manufactured as an integral or monolithic device, or by assembling two or more portions together (which could eliminate the need to use two plugs).

The sprinkler adapter 200 includes a body 204 that can include a first pipe receiver 208 and a second pipe receiver 212. The first pipe receiver 208 and second pipe receiver 212 can define a pipe axis 216. The pipe receivers 208, 212 can connect with respective pipes (e.g., one or more pipes 112) to receive fluid from a fluid supply (e.g., fluid supply 104), such as plastic pipes including CPVC pipes, or metal pipes. The pipe receivers 208, 212 can be secured with the connected pipes using adhesives (e.g., glue), threads, or fastening members (e.g., nuts and bolts). The pipe receivers 208, 212 can define a pipe channel 220 around a pipe axis 216, such that fluid from the fluid supply can flow through the connected pipes and through the pipe channel 220.

The body 204 can include a first sprinkler connector 224 and a second sprinkler connector 228. The sprinkler connectors 224, 228 can be fluidly coupled with the pipe channel 220 so that fluid in the pipe channel 220 can flow through the sprinkler connectors 224, 228. The sprinkler connectors 224, 228 and components thereof can have similar or substantially identical shapes (e.g., identical within manufacturing tolerances), which can enable the sprinkler adapter 200 to more easily be installed in various orientations.

The first sprinkler connector 224 can include a first sprinkler port 232. The first sprinkler port 232 can connect with a first sprinkler (e.g., sprinkler 108) to fluidly connect the first sprinkler 108 with the pipe channel 220. For example, the first sprinkler port 232 can include an engagement member 236, such as threads, to connect with the first sprinkler 108. The sprinkler connectors 224, 228 can be pipe-shaped to facilitate fluid flow.

The first sprinkler connector 224 can define a first connector axis 240, which can be spaced from and transverse to the pipe axis 216. The first sprinkler port 232 can define a first port axis 244, which can be transverse to the first connector axis 240. For example, the first port axis 244 can be substantially perpendicular to the first connector axis 240 (e.g., at an angle of 90 degrees+/−10 degrees, +/−5 degrees, +/−2 degrees, +/−1 degree), which can enable the sprinkler adapter 200 to maintain a compact form factor.

The second sprinkler connector 228 can include a second sprinkler port 248. The second sprinkler port 248 can connect with a second sprinkler 108 to fluidly connect the second sprinkler 108 with the pipe channel 220. For example, the second sprinkler port 248 can include an engagement member 252, such as threads, to connect with the second sprinkler 108.

The second sprinkler connector 228 can define a second connector axis 256, which can be spaced from and transverse to the pipe axis 216. The second connector axis 256 can be spaced from the first connector axis 240, and can be parallel with the first connector axis 240. The second sprinkler port 248 can define a second port axis 260, which can be transverse to the second connector axis 256. For example, the second port axis 260 can be substantially perpendicular to the second connector axis 256 (e.g., at an angle of 90 degrees+/−10 degrees, +/−5 degrees, +/−2 degrees, +/−1 degree), which can enable the sprinkler adapter 200 to maintain a compact form factor so that the sprinklers 108 can be installed in a relatively small space between opposing walls.

The first sprinkler port 232 can be formed by a first cap 264 that can couple with a first cap joint 268 that extends from the first sprinkler connector 224. The first cap 264 can define a first inner cap wall 304 that can be engaged with an outside of the first cap joint 268, such as with a first outer wall 308. For example, the first inner cap wall 304 and the first outer wall 308 can form a shear joint, such as through ultrasonic welding. The shear joint can form a hermetic seal, and may form an interference joint of 14/1000 inches. The first sprinkler port 232 (and various other cap or plug joints described herein) can be formed by spin welding, gluing, or threaded connections.

The sprinkler adapter 200 can include a first gasket 272 that can be received in the first sprinkler port 232. For example, the first cap joint 268 can define a first inner wall 312 that can receive the first gasket 272. The first cap joint 268 can include a first stop 316 that extends from the first inner wall 312 to hold the first gasket 272 between the engagement member 236 and the first stop 316. The first gasket 272 can be made from polyurethane.

The second sprinkler port 248 can be formed by a second cap 276 that can couple with a second cap joint 280 that extends from the second sprinkler connector 228. The second cap 276 can define a second inner cap wall 320 that can be engaged with an outside of the second cap joint 280, such as with a second outer wall 324. For example, the second inner cap wall 320 and the second outer wall 324 can form a shear joint, such as through ultrasonic welding.

The sprinkler adapter 200 can include a second gasket 284 that can be received in the second sprinkler port 248. For example, the second cap joint 280 can define a second inner wall 328 that can receive the second gasket 284. The second cap joint 280 can include a second stop 332 that extends from the second inner wall 328 to hold the second gasket 284 between the engagement member 252 and the second stop 332. The second gasket 284 can be made from polyurethane.

The sprinkler adapter 200 can include a first plug 288 that can be received in a first connector end 292 of the first sprinkler connector 224, and a second plug 296 that can be received in a second connector end 298 of the second sprinkler connector 228. The plugs 288, 296 can seal the respective connector ends 292, 298, such as by forming shear joints with the respective connector ends 292, 298. The connector ends 292, 298 can be similar or identical to the cap joints 268, 280, which can facilitate manufacturing of the sprinkler adapter 200 as the same welding, tooling, and process can be used for each of these components, and can enable flexible assembly of the sprinkler adapter 200 (e.g., the connector ends 292, 298 can receive either the caps or the plugs, and the cap joints 268, 280 can receive the other of either the caps or the plugs).

Figure 4:
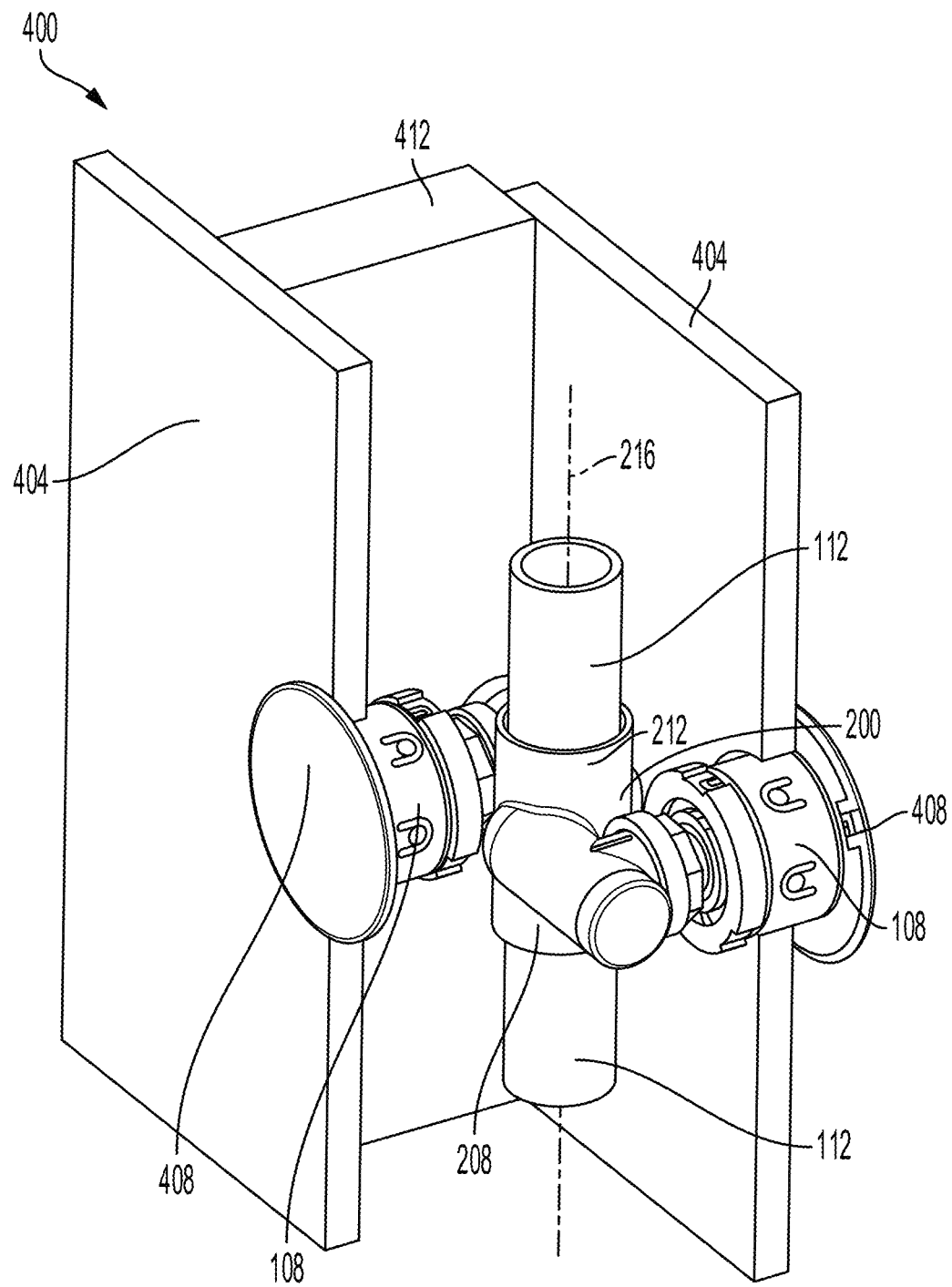
FIG. 4 depicts a perspective view of an example of a sprinkler adapter mounted between walls.
Figure 5:
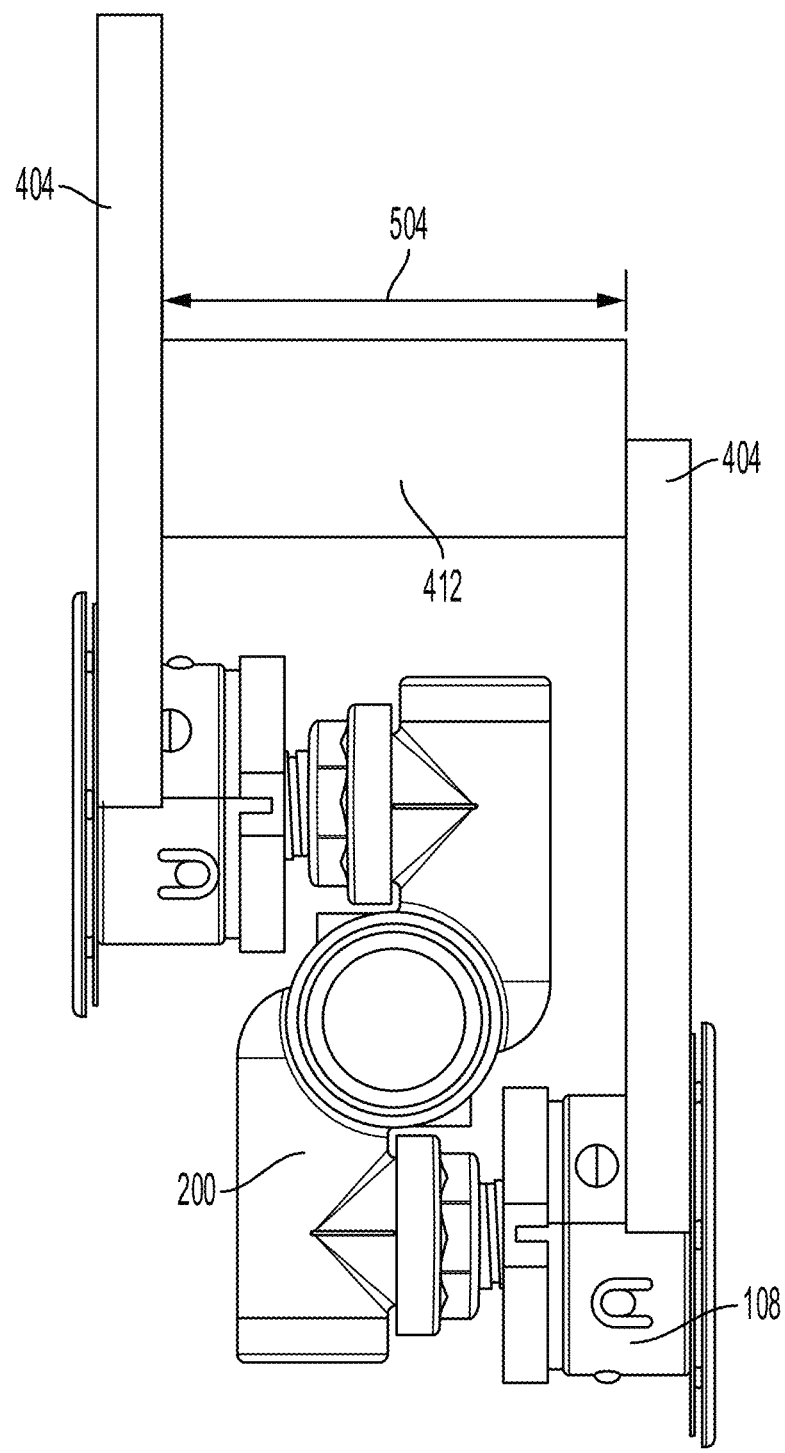
FIG. 5 depicts a top view of an example of a sprinkler adapter mounted between walls.

FIGS. 4 and 5 depict a sprinkler assembly 400 that includes the sprinkler adapter 200 and two sprinklers 108 installed between two walls 404. The sprinklers 108 can be installed as concealed sidewall sprinklers 108, having covers 408 positioned on an opposite side of the walls 404 from the sprinkler adapter 200. The walls 404 can form a portion of a building. The walls 404 can be made from drywall.

At least one support element 412, such as a stud (e.g., two inch by four inch stud), can extend between the walls 404. The at least one support element 412 can include multiple support elements 412 arranged along the walls 404, limiting space available for the sprinkler assembly 400. The support element 412 can define a wall spacing 504 between the walls 404. The wall spacing 504 can be greater than 2 inches and less than 5 inches. The wall spacing 504 can be 3.5 inches. Using the sprinkler adapter 200 can enable the sprinklers 108 to be installed in a back to back configuration as depicted in FIGS. 4 and 5. The sprinklers 108 can be installed in a same horizontal plane, as well as at various angles (e.g., a same vertical plane; at a 45 degree angle relative to a ceiling or a floor).

The sprinkler assembly 400 can include a first pipe 112 and a second pipe 112 respectively received by the first pipe receiver 208 and the second pipe receiver 212 of the sprinkler adapter 200. As such, fluid can flow through the pipes 112 into the pipe receivers 208, 212 and to the sprinklers 108. The sprinkler assembly 400 can be installed such that the pipe axis 216 is parallel with one or more walls 404.

Figure 6:
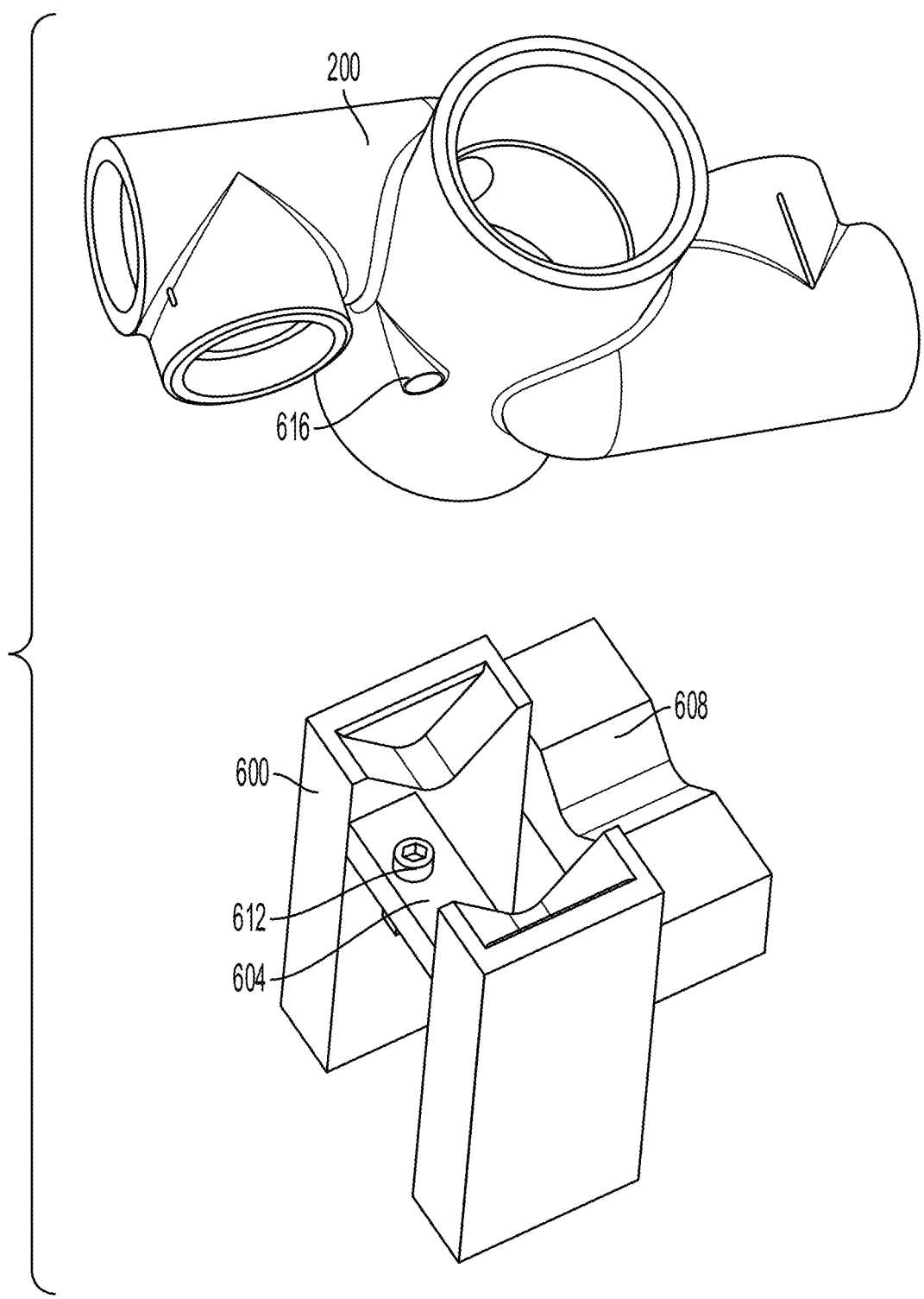
FIG. 6 depicts a perspective view of an example of an assembly device for use with a sprinkler adapter.

FIG. 6 depicts an assembly device 600 that can be used for assembly of the sprinkler adapter 200. The assembly device can include a first receiver 604 that receives the body 204 of the sprinkler adapter 200, and a second receiver 608 that extends from the first receiver 608 and receives one of the first sprinkler connector 224 or the second sprinkler connector 228.

The first receiver 604 and the second receiver 608 can align the sprinkler adapter 200 with an engagement member 612 that extends from the first receiver 604. The engagement member 612 can engage with a locating member (e.g., lug) 616 of the sprinkler adapter 200. The locating member 616 can extend from the body 204 in a plane perpendicular to the pipe axis 216. Responsive to the engagement member 612 contacting or engaging the locating member 616, a rotational position of the sprinkler adapter 200 relative to the pipe axis 216 can be set, enabling more accurate coupling of components such as caps and plugs with the sprinkler adapter 200 and stabilizing the body 204 during assembly. For example, the first receiver 604, second receiver 608, and locating member 616 can enable the sprinkler adapter 200 to be supported by the assembly device 600 in each of four orientations for coupling the caps 268, 276 and plugs 288, 296 with the sprinkler adapter 200 to facilitate assembly of the sprinkler adapter 200.

Figure 7:
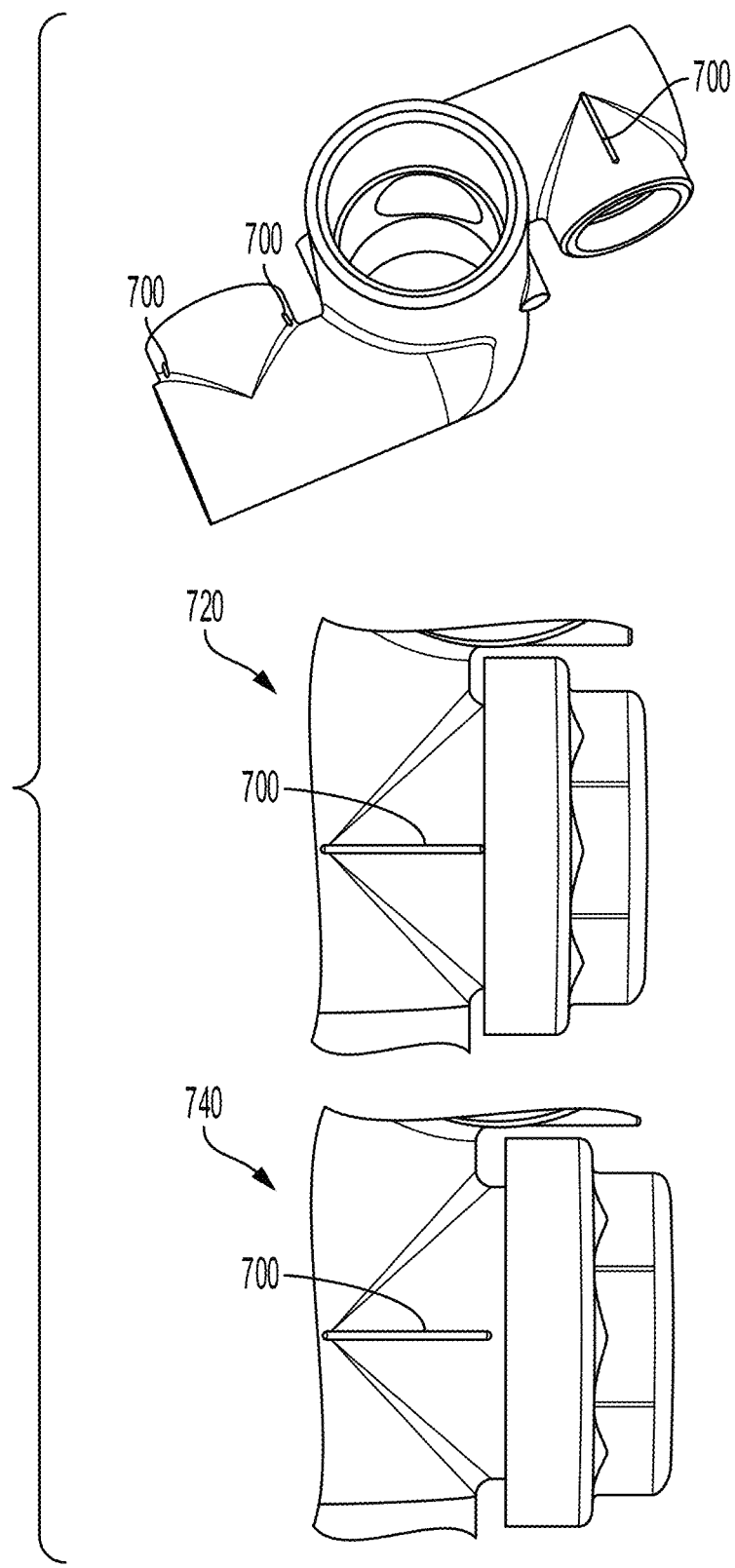
FIG. 7 depicts detail views of examples of engagement of a cap with a sprinkler adapter.

FIG. 7 depicts an assembly verification indicator 700 of the sprinkler adapter 200 with various examples of coupling of the first cap 264 (or the second cap 276) with the first cap joint 268 (or the second cap joint 280). The indicator 700 can extend along the first sprinkler port 232 to a distance from 704 from the first cap joint 268 such that the first cap 264 can be properly assembled with the first cap joint 268 up to (e.g., flush with) the indicator 700, such as for appropriate compression of the first gasket 272. For example, at 720, the first cap 264 is properly aligned with the indicator 700, while at 740, the first cap 264 is spaced from the indicator 700, which may indicate an improper alignment or part. The sprinkler adapter 200 can include a plurality of indicators 700 along each of the first sprinkler port 232 and the second sprinkler port 248 (e.g., three indicators 700 spaced by approximately 120 degrees radially around one or both of the respective sprinkler ports 232, 248), to facilitate visualization of the alignment between the caps and the sprinkler ports.

Figure 8:
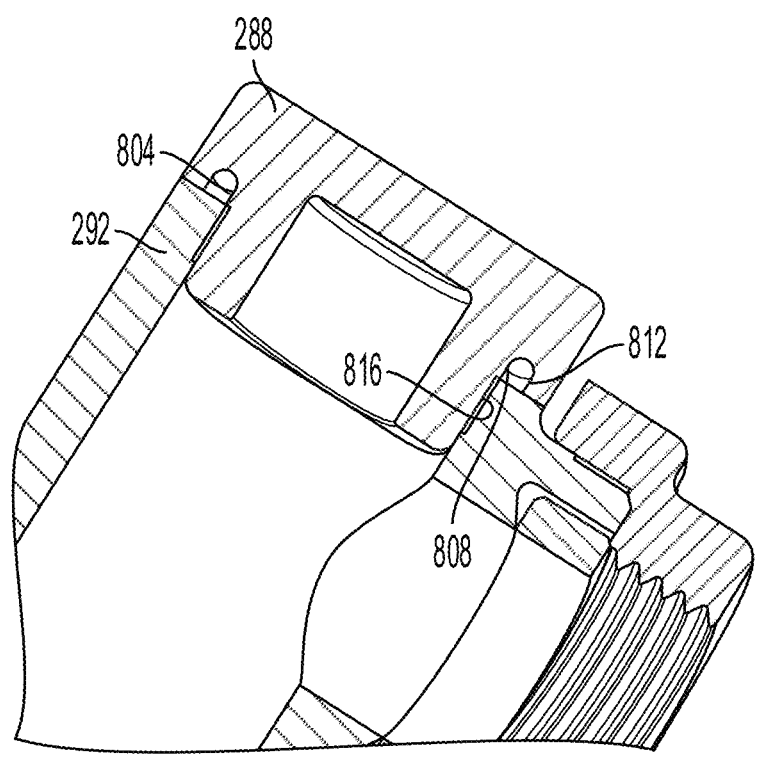
FIG. 8 depicts a detail view of an example of a joint of a sprinkler adapter.

FIG. 8 depicts a joint 800 of the sprinkler adapter 200 (e.g., a joint of the first plug 288 or the second plug 296). The first plug 288 can be coupled with the first connector end 292 by welding, such as ultrasonic welding to form an ultrasonic welding shear joint. The welding of the first plug 288 with the first connector end 292 can cause material to be displaced. The first plug 288 can define a groove 804, such as a flash trap, for excess material to be displaced so that it does not interfere with the contact between the first plug 288 and the first connector end 292, or with the first cap 264. The first plug 288 can include a first wall 808 and a second wall 812 outward from the first wall 808. The groove 804 can be defined between the first wall 808 and the second wall 808 (e.g., between a contiguous wall formed around the groove 804 by the first wall 808 and the second wall 808), so that the groove 804 is adjacent to the first connector end 292 when the welding is performed. The first wall 808 can be radially outward from a third wall 816 sized to be received within the first connector end 292.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act, or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical, or other positioning or orientation descriptions include variations within +/−10% or +/−10 degrees of pure vertical, parallel, or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A sprinkler adapter, comprising:
   a body made of chlorinated polyvinyl chloride;
   a first pipe receiver;
   a second pipe receiver;
   a first sprinkler port fluidly coupled with a channel, wherein the first sprinkler port defines a first port axis spaced from a pipe axis, and wherein the first sprinkler port includes a first cap to engage a first sprinkler;
   a second sprinkler port fluidly coupled with the channel, wherein the second sprinkler port defines a second port axis spaced from the first port axis and the pipe axis, and wherein the second sprinkler port includes a second cap to engage a second sprinkler;
   a first gasket in the first sprinkler port; and
   a second gasket in the second sprinkler port.

2. The sprinkler adapter of claim 1, wherein the first pipe receiver is configured for coupling with a first pipe, and the second pipe receiver is configured for coupling with a second pipe.

3. The sprinkler adapter of claim 1, wherein the channel extends between the first pipe receiver and the second pipe receiver along the pipe axis.

4. The sprinkler adapter of claim 1, wherein the first port axis is spaced from and transverse to the pipe axis.

5. The sprinkler adapter of claim 1, further comprising at least one sprinkler connector that extends between the channel and at least one of the first sprinkler port and the second sprinkler port.

6. The sprinkler adapter of claim 1, further comprising at least one sprinkler connector and at least one plug engaged with a connector end of the at least one sprinkler connector.

7. The sprinkler adapter of claim 1, wherein the first port axis is parallel with the second port axis; and the first sprinkler port faces an opposite direction as the second sprinkler port.

8. The sprinkler adapter of claim 1, wherein the first pipe receiver is configured for coupling with a first pipe, the first pipe having an inner diameter less than or equal to 1.5 inches.

9. The sprinkler adapter of claim 1, further comprising a first locating member that extends between the channel and the first sprinkler port.

10. A sprinkler assembly, comprising:
a first pipe receiver to couple with a first pipe;
a second pipe receiver to couple with a second pipe;
a channel extending between the first pipe receiver and the second pipe receiver;
a first sprinkler port fluidly coupled with the channel and a first sprinkler, the first sprinkler port having a first port axis, wherein the first sprinkler port comprises a first cap to engage with the first sprinkler;
a first gasket in the first sprinkler port; and
a second sprinkler port fluidly coupled with the channel and a second sprinkler, the second sprinkler port having a second port axis spaced from the first port axis, wherein the second sprinkler port comprises a second cap to engage with the second sprinkler.

11. The sprinkler assembly of claim 10, further comprising a second gasket disposed in the second sprinkler port.

12. The sprinkler assembly of claim 10, wherein the channel defines a pipe axis, and the first pipe and the second pipe are disposed coaxially with the channel along the pipe axis.

13. The sprinkler assembly of claim 10, further comprising at least one sprinkler connector that extends between the channel and at least one of the first sprinkler port and the second sprinkler port.

14. The sprinkler assembly of claim 10, further comprising a plug engaged with a connector end of a sprinkler connector by a shear joint.

15. The sprinkler assembly of claim 10, wherein the first pipe receiver, the second pipe receiver, the first sprinkler port, and the second sprinkler port include chlorinated polyvinyl chloride.

16. The sprinkler assembly of claim 10, comprising:
the first pipe coupled with a fluid supply;
the second pipe;
the first sprinkler; and
the second sprinkler.

17. The sprinkler assembly of claim 10, wherein the first pipe has an inner diameter less than or equal to 1.5 inches.

18. The sprinkler assembly of claim 10, wherein the first port axis is parallel with the second port axis, and the first sprinkler port faces an opposite direction as the second sprinkler port.

* * * * *